(12) United States Patent
Lee et al.

(10) Patent No.: US 7,843,797 B2
(45) Date of Patent: *Nov. 30, 2010

(54) OPTICAL INFORMATION STORAGE MEDIUM HAVING WRITE PROTECTION INFORMATION

(75) Inventors: Kyung-geun Lee, Gyeonggi-do (KR); Jung-wan Ko, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

This patent is subject to a terminal disclaimer.

(21) Appl. No.: 11/756,153

(22) Filed: May 31, 2007

(65) Prior Publication Data

US 2007/0223355 A1    Sep. 27, 2007

Related U.S. Application Data

(62) Division of application No. 10/630,977, filed on Jul. 31, 2003, now abandoned.

(30) Foreign Application Priority Data

Aug. 17, 2002    (KR) ................................ 2002-48706

(51) Int. Cl.
*G11B 7/24* (2006.01)

(52) U.S. Cl. ................ 369/275.3; 369/47.14; 369/53.17

(58) Field of Classification Search .............. 369/275.3, 369/275.1, 275.2, 275.4, 53.17, 53.15, 47.14
See application file for complete search history.

(56) References Cited

U.S. PATENT DOCUMENTS

| | | | |
|---|---|---|---|
| 4,418,100 | A | 11/1983 | Bedwell et al. |
| 5,271,018 | A | 12/1993 | Chan |
| 5,339,319 | A | 8/1994 | Yamane et al. |
| 6,160,778 | A * | 12/2000 | Ito et al. ............ 369/53.15 |
| 6,243,796 | B1 | 6/2001 | Otsuka |
| 6,351,447 | B1 | 2/2002 | Takagi et al. |
| 6,400,655 | B1 | 6/2002 | Kim |

(Continued)

FOREIGN PATENT DOCUMENTS

EP    0 464 811    1/1992

(Continued)

OTHER PUBLICATIONS

DRU-510 A, High Performance Dual RW DVD/CD Recorder for Microsoft Windows 98SE, Windows Millennium Edition, Windows 2000, and Windows XP Operating System (Sony Electronics Inc. 2003).

(Continued)

*Primary Examiner*—Tan X Dinh
(74) *Attorney, Agent, or Firm*—NSIP Law

(57) ABSTRACT

An optical information storage medium includes a lead-in area, a user data zone in which user data is recorded, and a lead-out area. Write protection information is recorded in at least one of the lead-in area and the lead-out area, together with defect management information. Information is recorded and/or reproduced according to the defect management information and the write protection information. The write protection information indicates a size of a write protected area differentiated from a plurality of sizes of write protected areas of the optical information storage medium.

19 Claims, 4 Drawing Sheets

| BYTE NO | CONTENTS | THE NUMBER OF BYTES |
|---|---|---|
| 0~(N-1) | ... | - |
| N | WRITE PROTECTION INFORMATION AND DEFECT MANAGEMENT INFORMATION | 1 |
| (N+1)-M | ... | - |

U.S. PATENT DOCUMENTS

| | | | |
|---|---|---|---|
| 6,480,446 | B1 | 11/2002 | Ko et al. |
| 6,496,455 | B1 | 12/2002 | Takagi et al. |
| 6,549,499 | B2 | 4/2003 | Takagi et al. |
| 6,556,522 | B1 | 4/2003 | Ko et al. |
| 6,560,177 | B2 | 5/2003 | Ko et al. |
| 6,611,483 | B1 | 8/2003 | Park et al. |
| 6,724,705 | B1 | 4/2004 | Ko et al. |
| 6,765,853 | B1 | 7/2004 | Ko et al. |
| 6,862,256 | B2 | 3/2005 | Lee et al. |
| 7,142,495 | B2 * | 11/2006 | Lee et al. ............... 369/53.21 |
| 7,283,454 | B2 * | 10/2007 | Hwang et al. ........... 369/275.3 |
| 7,327,655 | B2 * | 2/2008 | Hwang et al. ........... 369/53.17 |
| 7,362,678 | B2 * | 4/2008 | Ko et al. ................. 369/53.21 |
| 2002/0067673 | A1 | 6/2002 | Ko et al. |
| 2002/0075792 | A1 | 6/2002 | Ko et al. |
| 2002/0097665 | A1 | 7/2002 | Ko et al. |
| 2002/0145966 | A1 | 10/2002 | Hirotsune et al. |
| 2002/0176341 | A1 | 11/2002 | Ko et al. |
| 2003/0072236 | A1 | 4/2003 | Hirotsune et al. |
| 2003/0095480 | A1 | 5/2003 | Ko et al. |
| 2003/0123348 | A1 | 7/2003 | Ozaki |
| 2006/0023621 | A1 * | 2/2006 | Hwang et al. ........... 369/275.3 |
| 2008/0094994 | A1 * | 4/2008 | Lee et al. ................. 369/100 |

FOREIGN PATENT DOCUMENTS

| | | |
|---|---|---|
| EP | 0 965 988 | 12/1999 |
| JP | 63-113868 | 5/1988 |
| JP | 06-131816 | 5/1994 |
| JP | 08-138322 | 5/1996 |
| JP | 2000-003562 | 1/2000 |
| JP | 2000-36161 | 2/2000 |
| JP | 2001-331945 | 11/2001 |
| JP | 2001-351334 | 12/2001 |
| KR | 2000-5588 | 1/2000 |
| KR | 2000-31791 | 6/2000 |
| KR | 2000-33180 | 6/2000 |
| WO | WO 00/31737 | 6/2000 |

OTHER PUBLICATIONS

DRX-510 UL, High Performance External Dual RW DVD/CD Reorder for Microsoft Windows Operating Systems (Sony Electronics Inc. 2003).

Japanese Office Action issued on Feb. 2, 2010, in corresponding Japanese Patent Application No. 2004-528914 (3 pages).

Office Action issued by Japanese Patent Office in Japanese Patent Application No. 2004-528914 on Feb. 24, 2009.

Search Report issued Jun. 21, 2007 by the European Patent Office for European Application No. 03710488.2.

Office Action issued by Canadian Intellectual Property Office in Canadian Patent Application No. 2,494,070 on May 29, 2007.

U.S. Appl. No. 10/630,834 filed Jul. 31, 2003, Kyung-geun Lee et al., Samsung Electronics Co., Ltd.

U.S. Appl. No. 10/630,834 filed Jul. 31, 2003, Kyung-geun Lee et al., Samsung Electronics Co., Ltd.

U.S. Appl. No. 11/235,294 filed Sep. 27, 2005, Kyung-geun Lee, Samsung Electronics Co., Ltd.

U.S. Appl. No. 11/235,295 filed Sep. 27, 2005, Kyung-geun Lee, Samsung Electronics Co., Ltd.

U.S. Appl. No. 11/429,337 filed May 8, 2006, Kyung-geun Lee et al., Samsung Electronics Co., Ltd.

* cited by examiner

| BYTE NO | CONTENTS | THE NUMBER OF BYTES |
|---|---|---|
| 0~(N-1) | . . . | - |
| N | WRITE PROTECTION INFORMATION AND DEFECT MANAGEMENT INFORMATION | 1 |
| (N+1)~M | . . . | - |

OPTICAL INFORMATION STORAGE MEDIUM HAVING WRITE PROTECTION INFORMATION

CROSS-REFERENCE TO RELATED APPLICATIONS

This application is a divisional of U.S. patent application Ser. No. 10/630,977, filed Jul. 31, 2003, now abandoned, which claims the priority of Korean Patent Application No. 2002-48706, filed on Aug. 17, 2002, in the Korean Intellectual Property Office, the disclosures of which are incorporated herein in its entirety by reference.

BACKGROUND OF THE INVENTION

1. Field of the Invention

The present invention relates to an optical information storage medium and a method of recording information thereon, and more particularly, to an optical information storage medium on which write protection information and defect management information are recorded, and a method of recording such information thereon.

2. Description of the Related Art

Optical discs are generally used as information storage media of optical pickup devices which record information on and/or reproduce information from the optical discs without contacting the optical discs. Optical discs are classified as either compact discs (CDs) or digital versatile discs (DVDs) according to their information recording capacity. CDs and DVDs further include CD-Rs, CD-RWs, DVD+RWs, DVD-random access memories (DVD-RAMs), DVD-R/rewritables (DVD-RWs), and so forth. Furthermore, high-density digital versatile discs (HD-DVD) having a recording capacity of 20 GB or more have been developed.

When a user uses such an optical disc, the user may desire not to record supplemental information on the optical disc any more, depending on the intended use of the optical disc. For example, when the user desires to only reproduce data recorded as archived files, additional data must be prevented from being recorded on the optical disc. For this, the need for recording write protection information has been raised and write protection information has been already recorded on DVD-RAM/R/RWs. However, even when the optical disc is write-protected, a portion of the optical disc should be recordable, if necessary. For example, even if the optical disc is write-protected, data should be able to be recorded in an area such as a spare area so disc is write-protected, data should be able to be recorded in an area such as a spare area so that a defect area can be replaced with the spare area in order to manage defects, and as such, the write protection information and the defect management information should be able to be recorded on the optical disc, too.

SUMMARY OF THE INVENTION

The present invention provides an optical information storage medium on which defect management information necessary for indicating whether defect management is permitted is recorded when write protection information is recorded, and a method of recording information thereon.

Additional aspects and advantages of the invention will be set forth in part in the description Which follows and, in part, will be obvious from the description, or may be learned by practice of the invention.

According to an aspect of the present invention, there is provided an optical information storage medium including a lead-in area, a data zone in which user data is recorded, and a lead-out area. Here, write protection information is recorded along with defect management information in at least one of the lead-in area and lead-out area.

The data zone includes an inner spare area and an outer spare area, which are to replace a defect area, and a user data area in which the user data is recorded, and if the defect area can be managed, the user data area is write-protected. A drive test zone and a disc identification zone included in at least one of the lead-in area and the lead-out area, and the inner spare area and/or the outer spare area are recordable.

If the defect area cannot be managed, the user data area and a defect management zone included in at least one of the lead-in area and the lead-out area are write-protected. A drive test zone included in at least one of the lead-in area and the lead-out area and a disc identification zone which is included in at least one of the lead-in area and the lead-out area and in which the write protection information is recorded are recordable.

According to another aspect of the present invention, there is provided an optical storage medium comprising: a lead-in area; a data zone in which user data is recorded; and a lead-out area, wherein a write protection information is recorded to indicate one of and differentiate between a plurality of write protection statuses of the optical storage medium, each one of the plurality of write protection statuses indicating a size of a corresponding write protected area of the optical storage medium.

According to another aspect of the present invention, there is provided a method of recording information on and/or reproducing information from an optical information storage medium including a lead-in area, a user data zone in which user data is recorded, and a lead-out area. Write protection information is recorded. Defect management information necessary for indicating whether a defect area occurring when reproducing data can be managed is recorded.

According to another aspect of the present invention, there is provided a method of recording information on and/or reproducing information from an optical storage medium including a lead-in area, a data zone in which user data is recorded, and a lead-out area, the method comprising: recording write protection information which indicates one of and differentiates between a plurality of write protection statuses of the optical storage medium, one of the statuses being to allow defect management of a write protected optical storage medium.

According to another aspect of the present invention, there is provided an apparatus for recording data on and/or reproducing data from an optical storage medium, the apparatus comprising: a pickup to record data on and/or reproduce data from the optical storage medium; a system controller that records write protection information for indicating one of and differentiating between a plurality of write protection statuses of the optical storage medium, each one of the plurality of write protection statuses indicating a size of a corresponding write protected area.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE EMBODIMENTS

Figure 1:
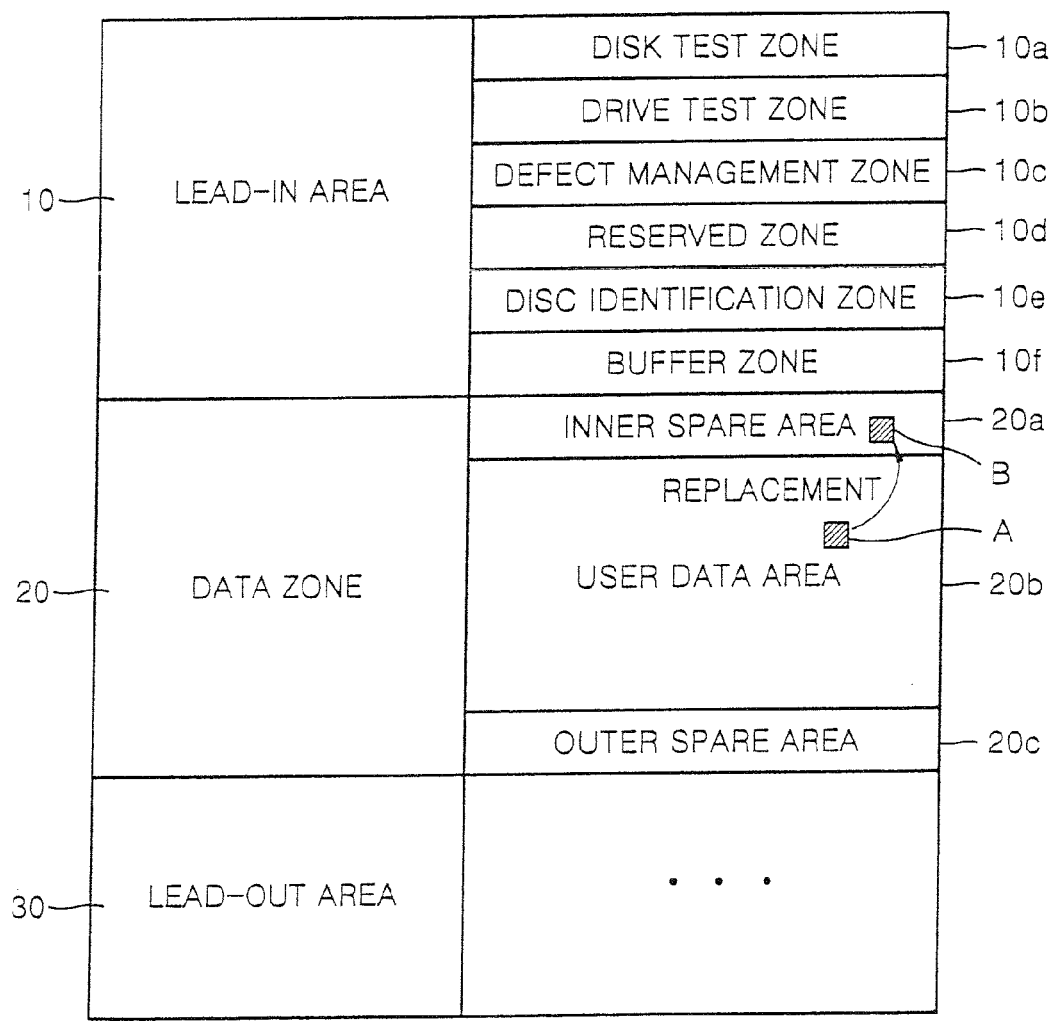
FIG. 1 illustrates the structure of an optical information storage medium according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 illustrates the schematic structure of an optical information storage medium (a disc) including a lead-in area 10, a data zone 20 in which user data is recorded, and a lead-out area 30. The lead-in area 10 may include a disc test zone 10a, a drive test zone 10b, a defect management zone 10c, a disc identification zone 10e, and a buffer zone 10f. The lead-in area 10 may further include at least one reserved zone 10d in which other pieces of information can be recorded.

Disc control information or information on the state of the disc can be generally recorded in the disc identification zone 10e. In the present invention, write protection information and defect management information can be recorded in the disc identification zone 10e. The disc identification zone 10e can also be called a "disc-related information zone" or a "disc control zone" according to various formats. The lead-out area 30 has a similar structure to the lead-in area 10, and thus will not be described herein.

The data zone 20 includes an inner spare area 20a and an outer spare area 20c, which are to be replaced with a defect area, and a user data area 20b in which user data is recorded. If the user data area 20b has a defect area, data recorded in the defect area is copied into the inner spare area 20a and/or the outer spare area 20c. In other words, if a defect area A appears when reproducing data recorded in the user data area 20b, the defect area A may be replaced with a predetermined area B of the inner spare area 20a.

Meanwhile, information on the defect area and information on the inner spare area 20a or the outer spare area 20c with which the defect area has been replaced can be recorded in the defect management zone 10c. Further, data can be reliably recorded and/or reproduced by managing the defect area. The information recorded in the defect management zone 10c may be, for example, position information on the defect area and the area with which the defect area has been replaced.

Figures 2, 3:
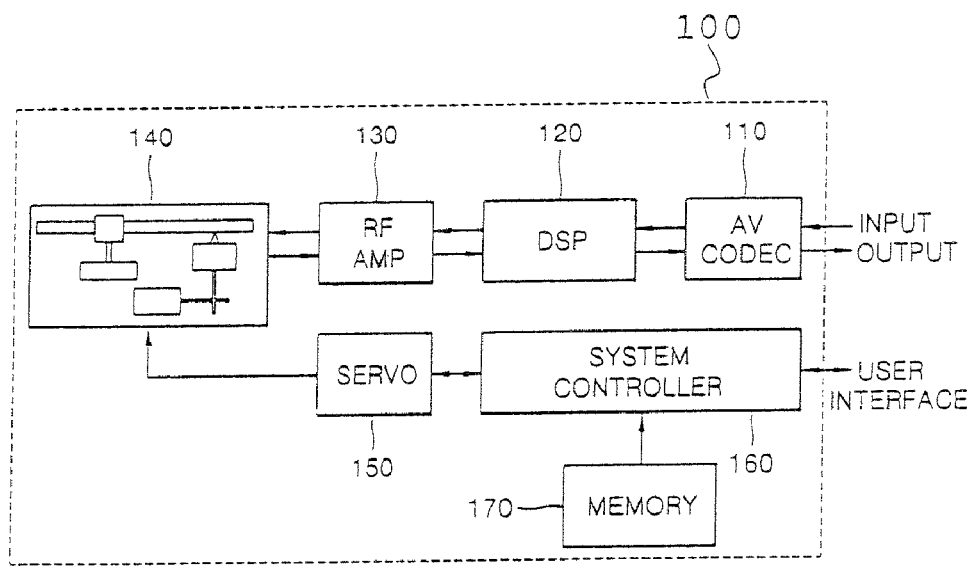
FIG. 2 is a view for explaining a method of recording write protection information on an optical information storage medium according to an embodiment of the present invention.
FIG. 3 is a block diagram of an apparatus for recording data and/or reproducing data from an optical information storage medium according to an embodiment of the present invention.

FIG. 2 illustrates write protection information recorded in a byte in a predetermined error correcting code (ECC) block of the disc identification zone 10e. Here, the following information can be recorded according to bit values.

TABLE 1

| Byte | Contents |
| --- | --- |
| 00000000b | Normal recording |
| 00000001b | Write protection information for (permanently) write-protecting all areas |
| 00000010b | Write protection information permitting defect management |
| 00000011b | Write protection information not permitting defect management |

In Table 1, "normal recording" indicates that data can be recorded, erased, and reproduced. "Write protection information for write-protecting all areas" indicates that data must not be recorded in all areas any more, i.e., all areas are permanently write-protected. In this case, additional defect management is not necessary and the write protection information cannot be amended.

"Write protection information permitting defect management" indicates that defects occurring when recording or reproducing data can be managed. Here, since information about the defect area has to be recorded to manage the defects, the defect management zone 10c of the lead-in area 10 should be recordable. Also, since data recorded in the defect area has to be copied into a spare area (e.g., the inner space area 20a or the outer space area 20b) so that the spare area replaces the defect area, the inner spare area 20a and the outer spare area 20c have to be recordable. The drive test zone 10b and the disc identification zone 10e also have to be recordable. Write protection information and defect management information is recorded in the disc identification zone 10e. Here, the write protection information may be selectively recorded by a user. In other words, the user can first record write protection information indicating that the disc is write protected in the disc identification zone 10e. Later, the user can record information indicating that the disc is recordable in the disc identification zone 10e. Thus, it is preferable that the disc identification zone 10e is recordable so that the write protection information can be updated. As described above, in an event that the write protection information permitting defect management is recorded, only the user data area 20b is write-protected.

"Write protection information not permitting defect management" indicates that defects occurring when recording or reproducing data cannot be managed. In this case, all areas are write-protected except the drive test zone 10b and the disc identification zone 10e. In other words, since the defects cannot be managed, the defect management zone 10c, the inner spare area 20a, the outer spare area 20c, and the user data area 20b are write-protected. Here, even if the defects cannot be managed, it is preferable that the drive test zone 10b is recordable to reproduce data and the disc identification zone 10e is recordable to update the write protection information and the defect management information.

As shown in FIG. 2, in an embodiment of the present invention, the write protection information is recorded in a byte in the disc identification zone 10e, i.e., in an N byte. However, the write protection information may be recorded in a plurality of bytes. Here, the write protection information and the defect management information can be recorded by a combination of bits in a predetermined byte. Alternatively, the write protection information and the defect management information may be recorded in separate bytes. In other words, the write protection information may be recorded in the N byte and the defect management information may be recorded in an (N+1) byte.

In an embodiment of the present invention, the write protection information and the defect management information can be recorded in at least one of the lead-in area 10 and the lead-out area 30. However, since the write protection information and the defect management information recorded in the lead-in area 10 or the lead-out area 30 may be damaged, the write protection information and the defect management information may be recorded in both the lead-in area 10 and the lead-out area 30.

In a method of recording information on an optical information storage medium according to an embodiment of the present invention, write protection information can be recorded in at least one of the lead-in area 10 and the lead-out area 30, along with defect management information necessary for indicating whether a defect area occurring when recording or reproducing data can be managed. The write protection information and the defect management information can be, for example, recorded in the disc identification zone 10e. As an example, the write protection is recorded to indicate one of a plurality of write protection statuses of the optical storage medium, and the write protection information may include information with regard to whether to allow defect management of the write protected optical storage medium.

If the defect management information indicates that the defect area can be managed, the drive test zone 10b, the defect management zone 10c, the inner spare area 20a, and the outer spare area 20c are recordable, and only the user data area 20b is write-protected. If the defect management information indicates that the defect area cannot be managed, the defect management zone 10c, the inner spare area 20a, the outer spare area 20c, and the user data area 20b are write-protected.

FIG. 3 is a block diagram of an apparatus 100 for recording data and/or reproducing data from an optical information storage medium according to the present invention. During recording, an AV codec 110 compression-codes an externally applied AV signal according to a predetermined compression scheme and supplies size information for the compressed data. A digital signal processor (DSP) 120 receives the compressed A/V data supplied from the AV codec 110, adds additional data for error correction code (ECC) processing thereto, and performs modulation using a predetermined modulation scheme. A radio frequency amplifier (RF AMP) 130 converts the modulated data from the DSP 120 into a radio frequency (RF) signal. Then, a pickup 140 records the RF signal supplied from the RF AMP 130 on a disc mounted on a turntable of the pickup 140. A servo 150 receives information necessary for servo control from a system controller 160 and stably performs a servo function for the mounted disc.

During playback of information data stored on the disc, the pickup 140 picks up an optical signal from the disc having the information data stored therein, and the information data is extracted from the optical signal. The RF AMP 130 converts the optical signal into an RF signal, and extracts a servo signal, for performing a servo function, and modulated data. The DSP 120 demodulates the modulated data supplied from the RF AMP 130 corresponding to the modulation scheme used during modulation, performs an ECC process to correct errors, and eliminates added data. The servo unit 150 receives information necessary for servo control from the RF AMP 130 and the system controller 160, and stably performs the servo function. The AV codec 110 decodes the compressed A/V data supplied from the DSP 120 to output an A/V signal. The system controller 160 controls the overall system for recording the information data on and reproducing the information data from the disc mounted on the turntable of the pickup 140.

Thus, the data recording and/or reproducing apparatus 100 can record the various types of information on the disc as described with reference to FIGS. 1 and 2, and/or reproduce the various types of information from the disc.

Figure 4:
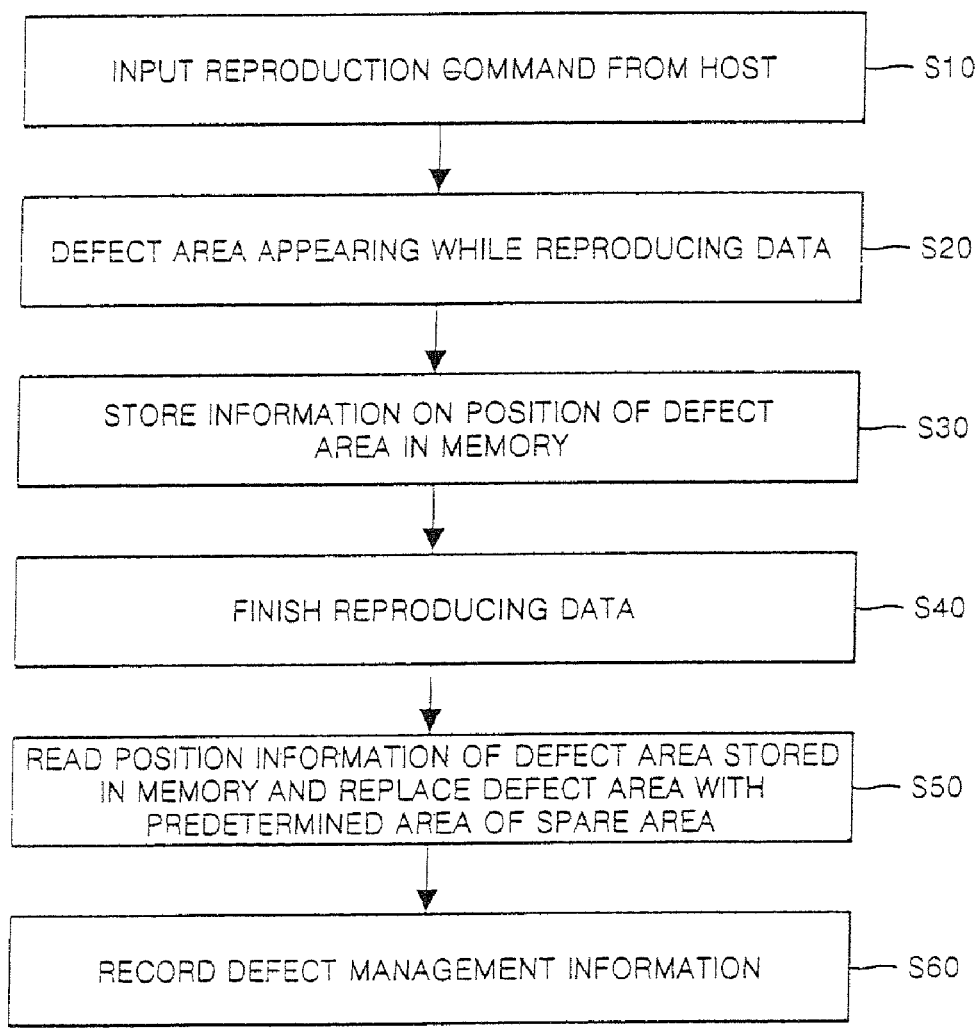
FIG. 4 is a flowchart for explaining a method of recording data and/or reproducing data from an optical information storage medium according to an embodiment of the present invention.

FIG. 4 is a flowchart for explaining a process of performing a data recording and/or reproducing method using the data recording and/or reproducing apparatus having the above-described structure, according to an embodiment of the present invention. In operation S10, a drive searches a disc for a physical address corresponding to a logical address requested by a host according to a reproduction command input from the host to reproduce data. Here, the drive corrects errors while reproducing data on an ECC block-by-block basis. Thus, if a defect or an error cannot be eliminated or corrected, the drive cannot reproduce data recorded in a block having the defect or the error. However, if the defect or the error in the block can be corrected by an ECC process, data can reproduced. Here, defects satisfying preset defect correction requirements can be corrected and managed. Thus, if an error-correctable defect occurs during reproduction of data in operation S20, in operation S30, information on the position of a defect area is stored in a memory 170 built in the system controller 160.

For example, referring to FIG. 1, if a defect appears in a fifth block when the drive reproduces data, information necessary for indicating that the fifth block is the defect area A is stored in the memory 170. Thereafter, in operation 40, the drive finishes reproducing information and the host does not give a reproduction command any more, i.e., the drive goes from a reproduction mode to a standby mode or the information storage medium is unloaded out of the drive. In operation 50, the position information of the defect area A stored in the memory 170 is read and data recorded in the defect area A (the fifth block) is copied into the predetermined area B of the inner spare area 20a or the outer spare area 20c, which is to replace the defect area A, while being reproduced. In operation 60, information on the positions of the defect area A and the predetermined area B are recorded as defect management information in the defect management zone 10c.

As described above, data of the defect area A copied into the predetermined area B can be reproduced using defect management information when reproducing the data recorded in the defect area A. In other words, by recording defect management information, data can be reliably reproduced by managing defects even if write protection information is recorded.

Figure 5:
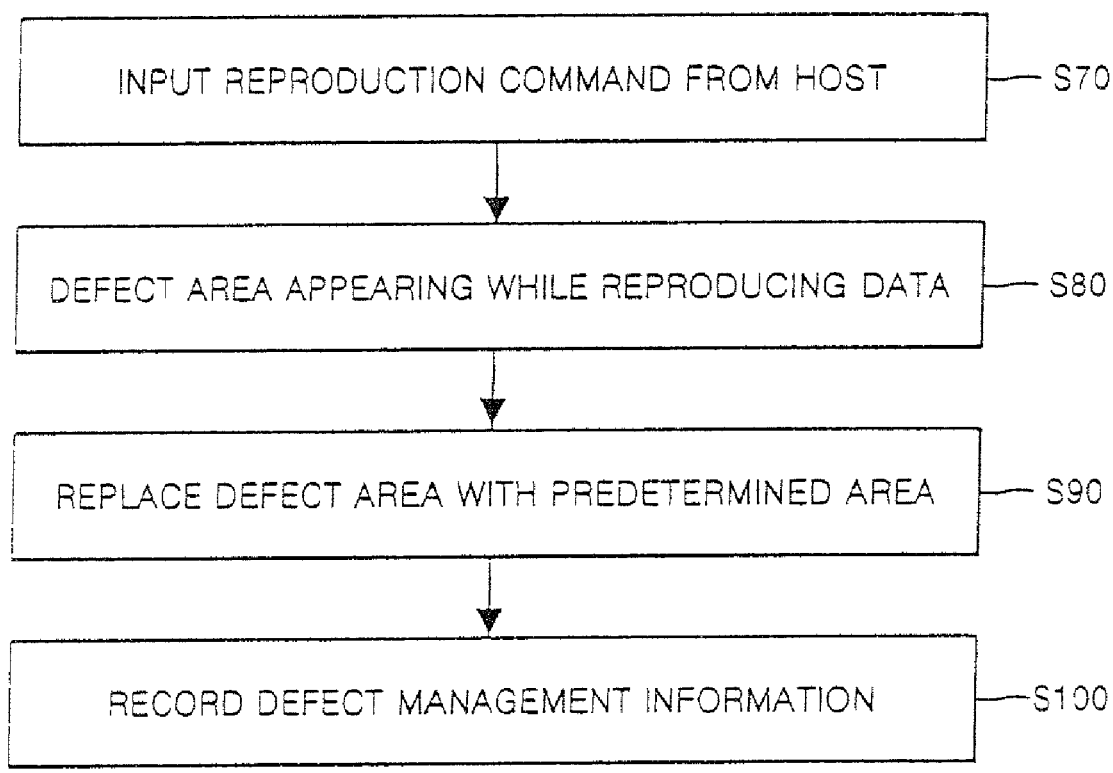
FIG. 5 is a flowchart for explaining a method of recording data and/or reproducing data from an optical information storage medium according to another embodiment of the present invention.

FIG. 5 is a flowchart for explaining a process of performing a data recording and/or reproducing method using the data recording and/or reproducing apparatus 100 having the above-described structure, according to another embodiment of the present invention. Referring to FIG. 5, in operations 70 and 80, a defect area appears when reproducing data according to a reproduction command input from a host. In operation 90, the defect area is replaced with a predetermined area of the inner spare area 20a or the outer spare area 20c. In operation 100, information on the positions of the defect area and the replaced area are recorded as defect management information in the defect management zone 10c. In the present embodiment, if a defect area appears, the defect area is immediately replaced with a predetermined area and information on the positions of the defect area and the predetermined area is recorded. Thus, an auxiliary memory is not necessary. The data recording and/or reproducing method described in the present embodiment can be performed when a recording and/or reproduction speed is faster than a speed demanded by a host.

Even when an information storage medium is write-protected, defects can be managed according to the above-described embodiments of the present invention.

While not required in all aspects, it is understood that the system controller 160 can be computer implementing the method using a computer program encoded on a computer readable medium. The computer can be implemented as a chip having firmware, or can be a general or special purpose computer programmable to perform the method.

In addition, it is understood that, in order to achieve a recording capacity of several dozen gigabytes, the pickup 140 could include a low wavelength, high numerical aperture type unit usable to record dozens of gigabytes of data on the disc. Examples of such units include, but are not limited to, those units using light wavelengths of 405 nm and having numerical apertures of 0.85, those units compatible with Blu-ray discs, and/or those units compatible with Advanced Optical Discs (AODs).

As described above, in an optical information storage medium and a method of recording information thereon according to the present invention, write protection information can be recorded together with defect management information necessary for indicating whether defects occurring when reproducing data can be managed. Even if the information storage medium is write-protected, the defects can be selectively managed using the defect management information. Thus, the write protection information indicates a size of a write protected area differentiated from a plurality of sized of write protected areas, wherein one of the statuses allows defect management of the write protected optical information storage medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical storage medium, comprising:
a lead-in area;
a data zone having a user data area in which user data is recorded and a spare area to replace a defect area in the user data area; and
a lead-out area,
wherein a write protection information is recorded in at least one of the lead-in area and the lead out area, the write protection information being selectable between a plurality of write protection statuses of the optical storage medium, one of which indicates that the spare area of the data zone is recordable and not write protected while the user data area of the data zone is not recordable and write protected in order to perform defect management of the optical storage medium by replacing the defect area of the data zone while write protected.

2. An optical storage medium comprising:
a lead-in area;
a data zone in which user data is recorded; and
a lead-out area,
wherein a write protection information is recorded in at least one of the lead-in area and the lead out area to indicate one of a plurality of write protection statuses of the optical storage medium, and one of the plurality of write protection statuses indicates that an area of the data zone is write protected and another area of the data zone is not write in the write protected optical storage medium to perform defect management of the optical storage medium by replacing a defect area of the data zone that is write protected,
the data zone includes a user data area and at least one of an inner spare area and an outer spare area, and
the area that is write protected includes the user data area and the another area that is not write protected includes at least one of the inner spare area and the outer spare area.

3. An optical storage medium comprising:
a lead-in area;
a data zone in which user data is recorded; and
a lead-out area,
wherein a write protection information is recorded in at least one of the lead-in area and the lead out area to indicate that an area of the data zone is not a write protected area of the write protected optical storage medium used to perform defect management of the write protected optical storage medium by replacing a defect area in another area of the data zone that is write protected while the another area is write protected,
the data zone includes a user data area and at least one of an inner spare area and an outer spare area, and
the another area of the data zone that is write protected includes the user data area and the area of the data zone that is not write protected includes the at least one of the inner spare area and the outer spare area.

4. An optical storage medium comprising:
a lead-in area;
a data zone in which user data is recorded; and
a lead-out area,
wherein a write protection information is recorded in at least one of the lead-in area and the lead out area to indicate one of a plurality of write protection statuses of the optical storage medium, one of the statuses being to allow defect management of a write protected optical storage medium using an area of the data zone that is not write protected to replace a defect area in another area of the data zone that is write protected,
the data zone includes a user data area and at least one of an inner spare area and an outer spare area, and
the area of the data zone that is not write protected includes the at least one of an inner spare area and an outer spare area.

5. A method of recording data on an optical storage medium comprising: a lead-in area; a data zone for use in recording user data; and a lead-out area, the method comprising:
detecting a write protection information from the optical storage medium and which indicates one of a plurality of write protection statuses of the optical storage medium, the write protection information being selectable between the plurality of write protection statuses and one of the plurality of write protection statuses indicating that a predetermined area of the optical storage medium is recordable to perform defect management of the optical storage medium by replacing a defect area in a portion of the data zone while the portion is write protected; and
recording the data on the optical storage medium according to the detected write protection information.

6. The method of claim 5, wherein the predetermined area includes another portion of the data zone.

7. The method of claim 6, wherein the data zone includes a user data area and at least one of an inner spare area and an outer spare area.

8. The method of claim 7, wherein the at least one of the inner and outer spare areas is recordable for replacing the defect area of the data zone while the write protection status is the one write protection status allowing the defect management.

9. The method of claim 7, wherein the write protection information is configurable to indicate a status in which only the user data area is write-protected while allowing recording to the at least one of the inner and outer spare areas.

10. The method of claim 5, wherein at least one of the lead-in area and the lead-out area comprises a drive test zone and a disc identification zone, and the data zone includes an inner spare area and/or an outer spare area which are recordable.

11. The method of claim 5, wherein at least one of the lead-in area and the lead-out area comprises:
   a drive test zone; and
   a disc identification zone in which the write protection information is recorded,
   wherein the drive test zone and the disc identification zone are recordable.

12. A method of recording data on an optical storage medium comprising a lead-in area; a data zone for use in recording user data; and a lead-out area, the method comprising:
   detecting a write protection information from the optical storage medium and which indicates that a predetermined area of the optical storage medium is recordable to perform defect management of the optical storage medium by replacing a defect area in a portion of the data zone while the portion is write protected, and which differentiates the predetermined area from a plurality of write protected areas of the optical storage medium that is not recordable; and
   recording the data on the optical storage medium using the detected write protection information.

13. The method of claim 12, wherein the predetermined area includes another portion of the data zone.

14. The method of claim 12, wherein the data zone includes a user data area and at least one of an inner spare area and an outer spare area.

15. The method of claim 13, wherein at least one of the inner and outer spare areas is useable to replace the defect area.

16. A method of recording data on an optical storage medium comprising a lead-in area; a data zone for use in recording user data; and a lead-out area, the method comprising:
   detecting a write protection information from the optical storage medium and which indicates one of a plurality of write protection statuses of the optical storage medium, the write protection information being selectable between the plurality of write protection statuses and one of the statuses being to allow defect management of a write protected optical storage medium; and
   recording the data on the optical storage medium according to the detected write protection information.

17. The method of claim 16, wherein the data zone includes a user data area and at least one of an inner spare area and an outer spare area.

18. The method of claim 16, wherein the at least one of the lead-in area and the lead-out area comprises a drive test zone and a disc identification zone, and the data zone includes an inner spare area and/or an outer spare area which are recordable.

19. The method of claim 17, wherein if the user data area has a defect area, at least one of the inner and outer spare areas is useable to replace the defect area.

* * * * *